Jan. 1, 1957 H. J. SANDS 2,775,805
CLAMP FOR TELESCOPED ANGLES
Filed Oct. 1, 1952

INVENTOR.
HILLARD J. SANDS
BY
ATTORNEY

United States Patent Office 2,775,805
Patented Jan. 1, 1957

2,775,805
CLAMP FOR TELESCOPED ANGLES

Hillard J. Sands, Cleveland, Ohio, assignor to The Harvard Manufacturing Company, Cleveland, Ohio, a corporation of Ohio Application October 1, 1952, Serial No. 312,525

2 Claims. (Cl. 24—243)

This invention relates to clamps, and especially to adjustable clamps particularly adapted for securing a pair of telescoped angles together.

In many instances, it is desirable to secure a pair of angles together in superimposed, telescoped relation. One use of angles in such relation is in the production of adjustable bedframes, and particularly bedframes for Hollywood beds. The bedframes may be easily and adjustably secured together when the frame components are clamped together, rather than being welded or riveted in permanent engagement. However, even though one supposedly uses angles of the same size in making different components of a frame, it may be that the angles are of slightly different size or shape. Hence, it is difficult to clamp such angles together tightly, or at least one angle must be distorted prior to its engagement with a companion angle of slightly different size. Conventional clamps used to secure a pair of angles together thus have required considerable tightening in some instances to bind the angles together tightly. Also, some angles have to be distorted when superimposed and pressed together for clamping engagement before the angles will contact to start the desired pressure engagement therebetween.

The general object of the invention is to provide a novel strap-type clamp characterized by its ability to provide initial clamping engagement between superimposed telescoped angles of slightly different sizes or shapes.

Another object of the invention is to provide a sturdy strap-type clamp with integral spacing fingers struck from the strap of the clamp to insure clamping contact between articles secured together by the clamp.

Another object of the invention is to provide a strap-type of a clamp which has means at a plurality of points to aid in bringing a pair of members into clamping contact with each other and the clamp.

A further object of the invention is to provide a novel inexpensive clamp of the class described which is of uncomplicated construction and can easily be engaged with pairs of telescoped angles.

Another object of the invention is to provide a pressure finger on a strap of a clamp for forcing the outer of two superimposed angles toward the inner by pressure at the apex of the outer angle.

The foregoing and other objects and advantages of the invention will be made more apparent as the specification proceeds.

In order to understand the present invention completely, reference should be had to the constructions illustrated in the accompanying drawings wherein currently preferred embodiments of the principles of the invention are illustrated, and wherein.

Figure 4:
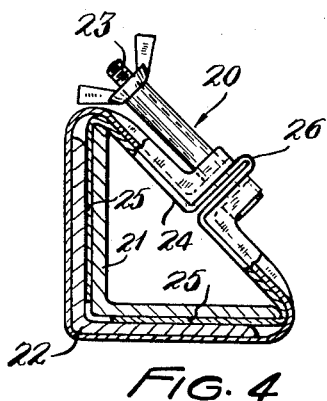
Fig. 4 is a vertical section taken on the line 4—4 of Fig. 3.
Figure 6:
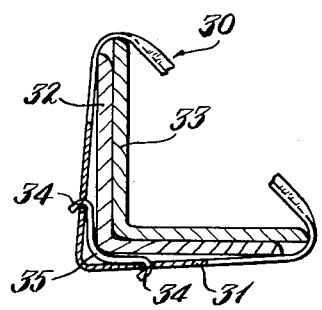
Figure 3:
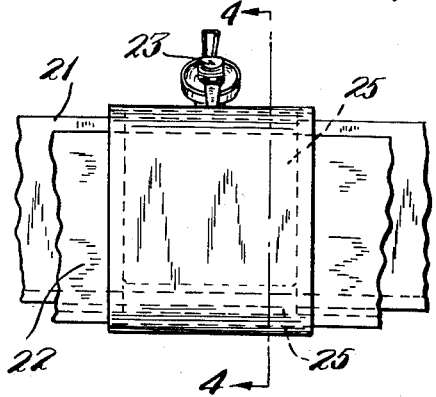
Fig. 3 is an elevation of a modified type of clamp and angle assembly of the invention.
Figure 5:
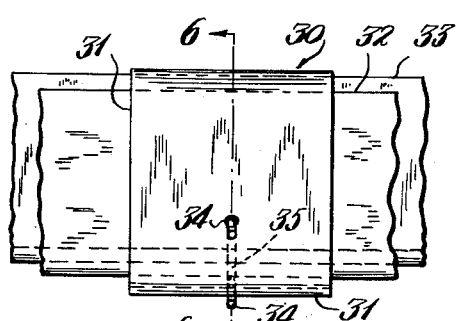

Figs. 5 and 6 are views similar to Figs. 3 and 4 of a further modification of the clamp and angle assembly of the invention with Figure 6 being taken on line 6—6 of Fig. 5.

The present invention, broadly speaking, relates to a strap type adjustable clamp especially adapted for securing a pair of telescoped angles together wherein the clamp comprises a strap for encircling a pair of telescoped angle members, and means for engaging end flanges provided on the metal strap to draw the strap tightly around the angle members, the strap being provided with metal spacer fingers extending therefrom to be positioned intermediate the telescoped angle members at the edge portions thereof to aid in obtaining compression contact between such angle members.

Figure 2:
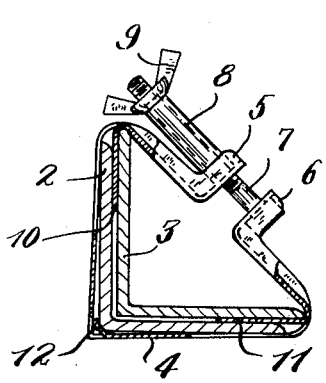
Fig. 2 is a vertical section taken on the line 2—2 of Fig. 1.
Figure 1:
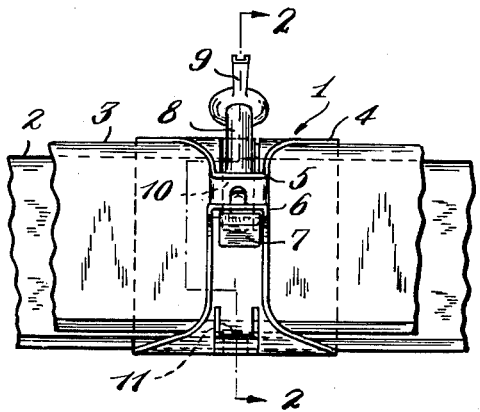
Fig. 1 is an elevation of an improved clamp and angle assembly of the invention.

With reference to the details of the structure shown in the drawings, a strap type of a clamp is indicated in general by the numeral 1 and is illustrated in Figs. 1 and 2 of the drawings. This clamp is used to secure a plurality of telescoped or superimposed angles 2 and 3 together. Usually the angles 2 and 3 are of right angular shape in section but they may have other shapes and sizes and with the angles 2 and 3 supposedly being of the same size and shape.

The clamp of the invention includes a metal strap 4 that encircles or encompasses the angles 2 and 3 and with the strap usually having end flanges 5 and 6 provided thereon. These end flanges 5 and 6 are positioned intermediate the edges of the inner angle 3, as shown in Fig. 2. Suitable bolt means, in this instance shown as a bolt 7, engage the end flanges 5 and 6 and a barrel washer 8 is carried by the bolt 7, intermediate the end flange 5, and a wing nut 9 used to secure the bolt to the end flanges. Thus the bolt is easily accessible at the edges of the angles and can readily be tightened to draw the end flanges 5 and 6 together to bring the strap 4 into tight engagement with the angles 2 and 3. The strap 4 usually is made of sheet metal of light gauge so that it can be initially bent or pulled around the associated angles easily to draw them into contact. However, in many instances, slight variations in the size or shape of the angles occur so that it requires appreciable deflection of one of the angles to bring them into compression engagement and this makes it difficult to tighten the strap 4 into its final locked position.

An important feature of the invention is that a pair of integral spacer fingers 10 and 11 are formed in the strap 4 at spaced portions thereof by punching or otherwise forming inwardly extending fingers 10 and 11 from the strap 4. These spacer fingers 10 and 11 are provided to be positioned intermediate the edge portions of the angles 2 and 3 and thus insure compression contact between the angles when the strap 4 is initially brought into engagement therewith. As such fingers 10 and 11 are integral with the strap 4 and can be easily and inexpensively formed, they do not add any appreciable cost or difficulty to the manufacture of the clamp 1. However, the fingers 10 and 11 provide immediate, desirable contact between the angles 2 and 3 so that only a minimum of tightening of the bolt 7 is required to bring the clamp 1 into positive engagement with the angles 2 and 3 and compress them into fixed relation with each other.

Another important feature of the clamp that aids in securing engagement between the angles is the inwardly extending top finger 12 formed in the strap 4 by pressing or punching a portion of the strap out of the plane originally occupied by a cross sectional area of the strap. This top finger 12 is positioned so that it will normally engage the apex of the outer angle 2 and urge it inwardly with relation to the clamp 1 and members engaged thereby. Thus, such top finger 12, even though resilient, will still initially urge the angles 2 and 3 toward each other to obtain the desired compression contact therebetween. While both the top finger 12 and the pair of spacer fingers 10 and 11 are shown in the clamp of the invention, it is possible to obtain desirable results with the novel clamp when either the pair of spacer fingers are used alone or where the top finger is used by itself.

In the modification of the invention shown in Figs. 3 and 4, a clamp 20 is shown engaging a pair of angle members 21 and 22. In this instance, the clamp 20 has a bolt 23 used in securing the clamp in position. As an important feature of the modification of the invention, a separate spacer 24 is provided and it has end portions or fingers 25, 25 of a desired length extending therefrom positioned intermediate the pair of angles 21 and 22. The spacer 24 preferably is positively secured in the clamp assembly and is positioned by means of a suitable member which, in this instance, is shown as comprising a double thickness outwardly directed flange 26 that is so constructed and arranged, that it will normally be positioned intermediate adajcent edge flanges in the strap portion of the clamp 20. Such flange 26 has suitable apertures therein through which the shank of the bolt 23 may extend so that the spacer 24 will be positively but loosely engaged with the remainder of the clamp. Thus again the strap type clamp of the invention is adapted to provide an initial solid or tight compression engagement between the angles 21 and 22.

The modification of the clamp of the invention shown in Figs. 5 and 6 especially relates to means for forcing the outer angle in towards the inner angle of the angles engaged by the clamp. Thus a clamp 30 is shown of generally similar construction to the clamp 20 and it has an integral metal strap 31 engaging the outer of two angles 32 and 33 retained in engagement by the clamp 30. The strap 31 has a pair of holes or bores 34 provided therein at spaced portions thereof on opposite sides of the apex of the outer angle 32. The clamp 30 is completed by means of a somewhat resilient member, such as a wire 35, which engages the holes 34 and extends therebetween for resilient engagement with the outer angle 32 to aid in pressing it into initial engagement with the inner angle as soon as the strap 31 is drawn into any contact with the outer angle. If necessary, the strap 31 may be reinforced adjacent the holes 34, or the wire or similar member used could be welded to the strap 31. If desired, spacer fingers, like the fingers 10 and 11, may be provided on the strap 31.

It will be seen that the clamps of the invention have means thereon for initially engaging a pair of angles to aid in bringing them into initial clamping contact. That is, the spacer fingers of the clamps of the invention will compensate for any slight initial size or shape differentials in a pair of superimposed angles and insure contact between the angles through the spacer fingers where the fingers are positioned therebetween. The straps of the clamps of the invention both squeeze the outer angle onto the inner angle at the edges thereof and also push the inner angle up towards the outer angle to force the angles into engagement at their apices. The spacer fingers 10 and 11 or similar means provided are of any suitable length and can easily be positioned intermediate the associated angles before tightening the clamp so that the clamp is easy to install. The clamps of the invention furthermore require only a minimum of tightening to bring them and the angles engaged thereby into clamping engagement so that the objects of the invention are achieved.

While several complete embodiments of the invention have been disclosed herein, it will be appreciated that modifications of these particular embodiments of the invention may be resorted to without departing from the scope of the invention as defined by the appended claims.

Having thus described my invention, what I claim is:

1. In combination, a pair of telescoped angles, a clamp strap formed into a loop extending around and engaging the pair of angles, means for tightening the looped clamp strap, said clamp strap having integral fingers extending therefrom and positioned intermediate the angles at the edges thereof to insure contact between the angles, and means in operative association with said clamp strap and engaging the angles at the apex of the outer angle to aid in securing said clamp strap thereto.

2. A strap-type adjustable clamp for a pair of telescoped angles or the like, which clamp comprises a metal strap for encompassing a pair of telescoped angle members, said metal strap having end flanges thereon positioned in parallel spaced relation, bolt means engaging said end flanges for securing said metal strap to the angle members, and metal spacer fingers, said spacer fingers being integral with said metal strap and extending inwardly of a loop formed by said metal strap at circumferentially spaced portions thereof.

References Cited in the file of this patent
UNITED STATES PATENTS

| 1,000,213 | Trimble | Aug. 8, 1911 |
| 1,221,946 | Youmans | Apr. 10, 1917 |
| 1,412,562 | Matuschak | Apr. 11, 1922 |
| 1,489,068 | Drake | Apr. 1, 1924 |
| 2,183,551 | Dold | Dec. 19, 1939 |